(12) United States Patent
Lin

(10) Patent No.: US 12,292,676 B2
(45) Date of Patent: May 6, 2025

(54) ILLUMINATION SYSTEM FOR PROJECTOR

(71) Applicant: DELTA ELECTRONICS, INC., Taoyuan (TW)

(72) Inventor: Chih-Hao Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 422 days.

(21) Appl. No.: 18/047,645

(22) Filed: Oct. 18, 2022

(65) Prior Publication Data
US 2024/0012319 A1   Jan. 11, 2024

(30) Foreign Application Priority Data
Jul. 7, 2022  (CN) .......................... 202210803174.6

(51) Int. Cl.
*G03B 21/20*   (2006.01)
(52) U.S. Cl.
CPC ....... *G03B 21/204* (2013.01); *G03B 21/2066* (2013.01)
(58) Field of Classification Search
CPC  G03B 21/204; G03B 21/2066; G03B 21/206; G03B 21/208
USPC ........................................................... 353/31
See application file for complete search history.

(56) References Cited

U.S. PATENT DOCUMENTS

| 10,509,303 | B2 | 12/2019 | Li | |
| 11,327,294 | B2* | 5/2022 | Zhang | G02B 26/0833 |
| 2020/0159101 | A1* | 5/2020 | Fan | F21V 9/40 |
| 2023/0176466 | A1* | 6/2023 | Lee | G03B 21/00 |

FOREIGN PATENT DOCUMENTS

| CN | 107300825 A | 10/2017 | |
| EP | 4071550 A1 * | 10/2022 | G02B 27/283 |
| TW | I498662 B | 9/2015 | |

* cited by examiner

*Primary Examiner* — Magda Cruz
(74) *Attorney, Agent, or Firm* — CKC & Partners Co., LLC

(57) ABSTRACT

An illumination system for a projector includes a light engine module, a light source module, a reflective mirror, a beam splitter, a phosphor wheel, and a lens assembly. The light source module can emit blue light along a first direction. The reflective mirror may reflect the blue light such that the blue light transmits in a second direction. A reflective region of the phosphor wheel can reflect a first portion of the blue light, and a first wavelength conversion region of the phosphor wheel can to activate a second portion of the blue light to form first band light. The lens assembly is configured to allow the first band light to pass through. The reflective region of the beam splitter is configured to reflect the first portion of the blue light and the first band light to the light engine module along the first direction.

20 Claims, 9 Drawing Sheets

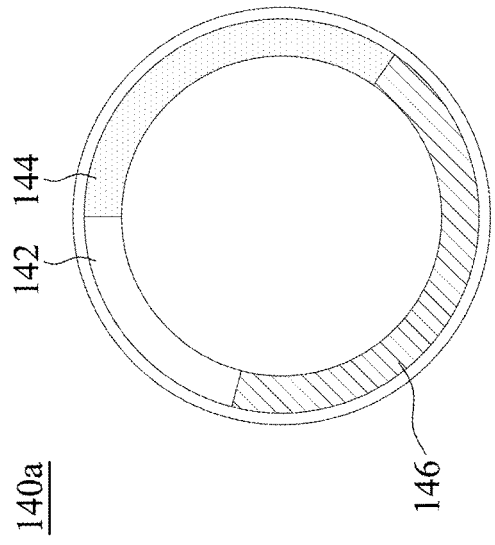
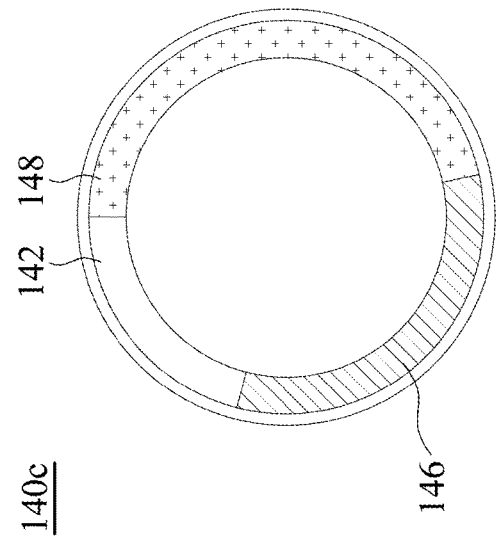
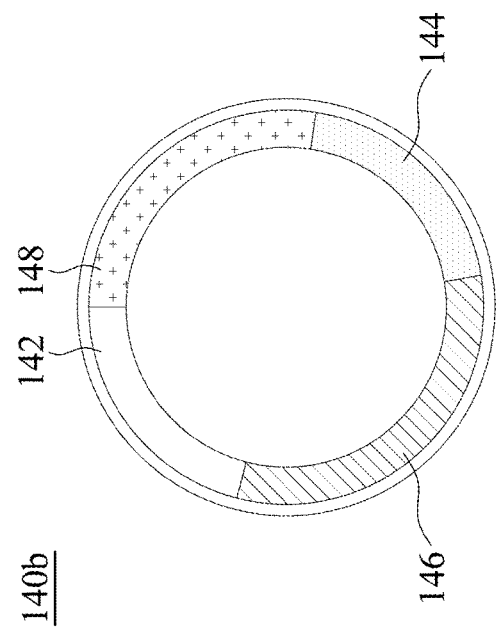

ILLUMINATION SYSTEM FOR PROJECTOR

CROSS-REFERENCE TO RELATED APPLICATIONS

This application claims priority to China Application Serial Number 202210803174.6, filed Jul. 7, 2022, which is herein incorporated by reference.

BACKGROUND

Field of Invention

The present disclosure relates to an illumination system for a projector.

Description of Related Art

In the current projector market, there are more and more projectors with different external designs, such as slim projectors, ultra-short-throw projectors, portable mini projectors, etc. A light source module, a lens, a reflector, a beam splitter, a light engine module, a heat dissipation device, etc., can be disposed in a casing of a projector. The position arrangement of these components not only affects the optical path, but also affects the space configuration in the casing, thereby limiting the appearance of the casing.

In a traditional illumination system of a laser projector, light emitted by a light source module is reflected to a phosphor wheel by a reflective region of a beam splitter. The configuration is not easy to use in a slender projection system because of the light transmits toward a light engine module after the light is reflected and refracted by the phosphor wheel. In addition, since the light-emitting direction of the light source module is not parallel to the light-receiving direction of the light engine module, it is easy to cause angle deviations in the light path of a product during manufacturing processes, thereby affecting light efficiency.

SUMMARY

One aspect of the present disclosure provides an illumination system for a projector.

According to some embodiments of the present disclosure, an illumination system for a projector includes a light engine module, a light source module, a reflective mirror, a first beam splitter, a phosphor wheel, and a lens assembly. A first direction is defined from the light source module to the light engine module, and the light source module is configured to emit blue light along the first direction. The reflective mirror is configured to reflect the blue light such that the blue light transmits in a second direction. The first beam splitter has a blue light transmissive region and a reflective region, wherein the blue light transmissive region of the first beam splitter is configured to allow the blue light that transmits in the second direction to pass through. The phosphor wheel has a reflective region and a first wavelength conversion region, wherein the reflective region of the phosphor wheel is configured to reflect a first portion of the blue light. The first wavelength conversion region is configured to activate a second portion of the blue light to form first band light. The lens assembly is located between the first beam splitter and the phosphor wheel. The lens assembly is configured to refract the blue light that transmits in the second direction to the phosphor wheel, configured to refract the first portion of the blue light to the reflective region of the first beam splitter in a third direction opposite to the second direction, and configured to allow the first band light to pass through. The reflective region of the first beam splitter is configured to reflect the first portion of the blue light and the first band light to the light engine module along the first direction.

In some embodiments, the reflective mirror is located between the light source module and the first beam splitter.

In some embodiments, the reflective mirror is perpendicular to the first beam splitter.

In some embodiments, the first beam splitter is located between the reflective mirror and the light engine module.

In some embodiments, the illumination system for the projector further includes a beam reducing module located between the light source module and the reflective mirror.

In some embodiments, the illumination system for the projector further includes a light concentrating module located between the first beam splitter and the light engine module.

In some embodiments, the reflective region of the phosphor wheel is a mirror surface.

In some embodiments, a material of the reflective region of the phosphor wheel includes silver, white glue, or titanium dioxide ($TiO_2$).

In some embodiments, the first wavelength conversion region of the phosphor wheel includes yellow phosphors.

In some embodiments, the phosphor wheel further includes a second wavelength conversion region configured to activate a third portion of the blue light to form a second band light.

In some embodiments, the second wavelength conversion region of the phosphor wheel includes green phosphors.

In some embodiments, the phosphor wheel further includes a third wavelength conversion region configured to activate a fourth portion of the blue light to form a third band light.

In some embodiments, the third wavelength conversion region of the phosphor wheel includes red phosphors.

In some embodiments, the phosphor wheel further includes a second wavelength conversion region, and the first wavelength conversion region and the second wavelength conversion region respectively include red phosphors and green phosphors.

In some embodiments, the illumination system for the projector further includes a second beam splitter located between the first beam splitter and the lens assembly. The second beam splitter is configured to reflect the first portion of the blue light and allow the first band light to pass through.

In the aforementioned embodiments of the present disclosure, since the light source module emits the blue light along the first direction and the blue light may be reflected by the reflective mirror to pass through the blue light transmissive region of the first beam splitter such that the first portion of the blue light may be reflected by the reflective region of the phosphor wheel.

The second portion of the blue light may be activated by the first wavelength conversion region of the phosphor wheel to form first band light, and the reflective region of the first beam splitter can reflect the first portion of the blue light and the first band light to the light engine module along the first direction.

The light-emitting direction of the light source module is the same as the light-receiving direction of the light engine module (i.e., the first direction), which results in a T-type light path. Such a configuration may be suitable for a slim projection system. Moreover, since the light-emitting direction of the light source module and the light-receiving direction of the light engine module are the same, angle deviations in the light path of a product during manufacturing processes can be prevented, thereby improving light efficiency.

Another aspect of the present disclosure provides an illumination system for a projector.

According to some embodiments of the present disclosure, an illumination system for a projector includes a light engine module, a light source module, a first reflective mirror, a first beam splitter, a phosphor wheel, a second reflective mirror, and a lens assembly.

A first direction is defined from the light source module to the light engine module, and the light source module is configured to emit blue light along the first direction. The first reflective mirror is configured to reflect the blue light such that the blue light transmits in a second direction. The first beam splitter is configured to allow the blue light that transmits in the second direction to pass through. The phosphor wheel has a reflective region and a first wavelength conversion region, wherein the reflective region of the phosphor wheel is configured to reflect a first portion of the blue light, and the first wavelength conversion region is configured to activate a second portion of the blue light to form first band light.

The second reflective mirror is connected to one end of the first beam splitter.

The lens assembly is located between the first beam splitter and the phosphor wheel, configured to refract the blue light that transmits in the second direction to the phosphor wheel, configured to refract the first portion of the blue light to the second reflective mirror in a third direction opposite to the second direction, and configured to allow the first band light to pass through.

The second reflective mirror is configured to reflect the first portion of the blue light and the first band light to the light engine module along the first direction.

In some embodiments, the second reflective mirror extends from said end of the first beam splitter along a lengthwise direction of the first beam splitter.

In some embodiments, the first reflective mirror is perpendicular to the second reflective mirror.

In some embodiments, the illumination system for the projector further includes a second beam splitter located between the second reflective mirror and the lens assembly. The second beam splitter is configured to reflect the first portion of the blue light and allow first band light to pass through.

In some embodiments, the reflective region of the phosphor wheel is a mirror surface, and the first wavelength conversion region of the phosphor wheel includes yellow phosphors.

In the aforementioned embodiments of the present disclosure, the light source module emits the blue light along the first direction and the blue light may be reflected by the first reflective mirror to pass through the first beam splitter, and thus the first portion of the blue light may be reflected by the reflective region of the phosphor wheel.

Furthermore, since the second portion of the blue light may be activated by the first wavelength conversion region of the phosphor wheel to form first band light, and the second reflective mirror can reflect the first portion of the blue light and the first band light to the light engine module along the first direction, the light-emitting direction of the light source module is the same as the light-receiving direction of the light engine module (i.e., the first direction), which results in a T-type light path.

Such a configuration may be suitable for a slim projection system. Moreover, since the light-emitting direction of the light source module and the light-receiving direction of the light engine module are the same, angle deviations in the light path of a product during manufacturing processes can be prevented, thereby improving light efficiency.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 5 to 7 are top views of phosphor wheels according to various embodiments of the present disclosure.

DETAILED DESCRIPTION

Figure 1:
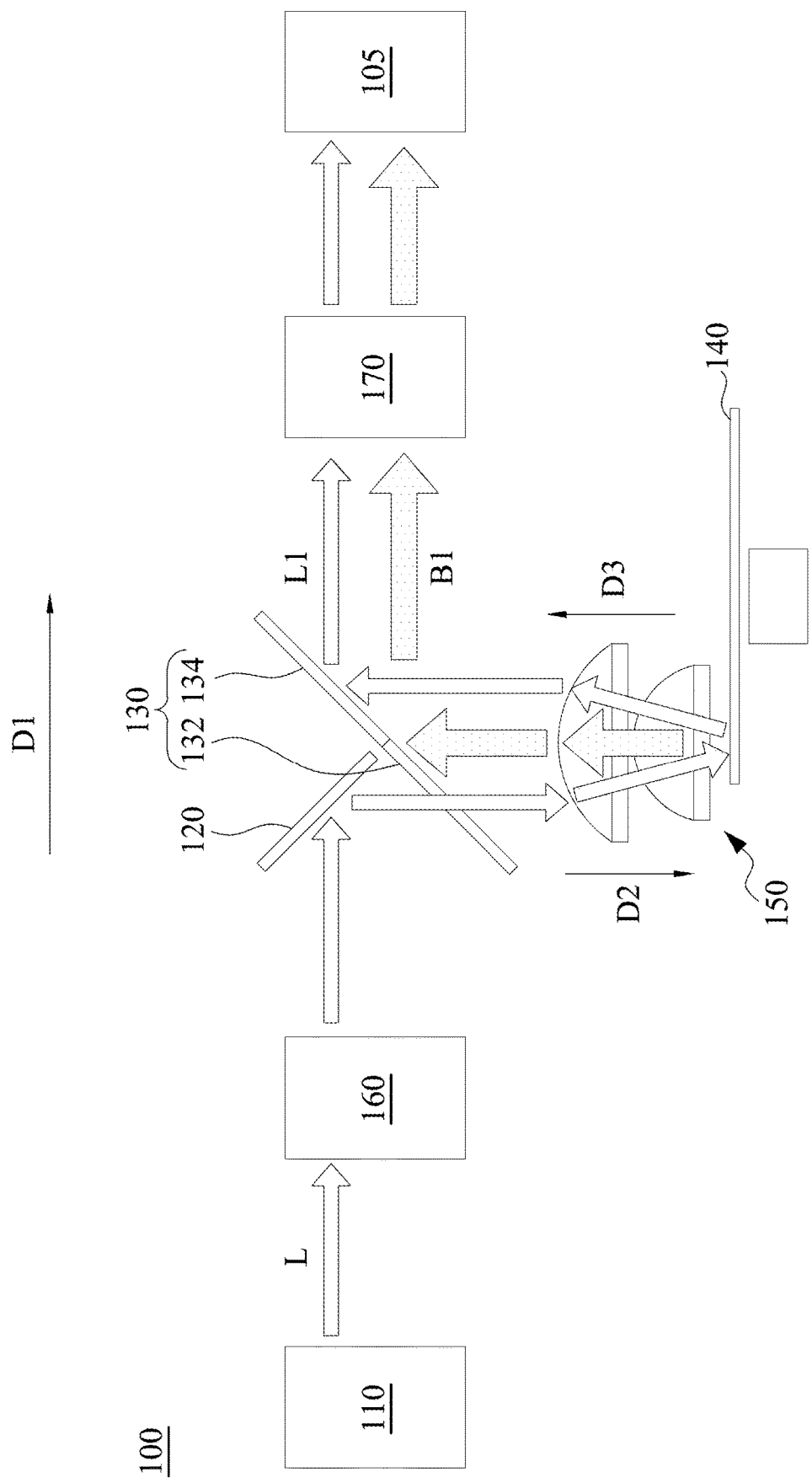
FIG. 1 is a schematic view of a light path of an illumination system for a projector when being in operation according to one embodiment of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a schematic view of a light path of an illumination system 100 for a projector when being in operation according to one embodiment of the present disclosure. The illumination system 100 for the projector includes a light engine module 105, a light source module 110, a reflective mirror 120, a first beam splitter 130, a phosphor wheel 140, and a lens assembly 150. A first direction D1 is defined from the light source module 110 to the light engine module 105. The light source module 110 may emit blue light L along the first direction D1. The reflective mirror 120 is located between the light source module 110 and the first beam splitter 130. The reflective mirror 120 may reflect the blue light L such that the blue light L transmits in a second direction D2. The first beam splitter 130 is located between the reflective mirror 120 and the light engine module 105. In some embodiments, the reflective mirror 120 is substantially perpendicular to the first beam splitter 130. The first beam splitter 130 has a blue light transmissive region 132 and a reflective region 134. The blue light transmissive region 132 of the first beam splitter 130 may allow the blue light L that transmits in the second direction D2 to pass through.

In some embodiments, the light source module 110 may include plural laser light sources, such as a 5×5 matrix arrangement. The illumination system 100 for the projector further includes a beam reducing module 160. The beam reducing module 160 is located between the light source module 110 and the reflective mirror 120, and can concentrate the laser beam (i.e., the blue light L) to reduce light energy loss between the reflective mirror 120 and the blue light transmissive region 132 of the first beam splitter 130.

Figure 2:
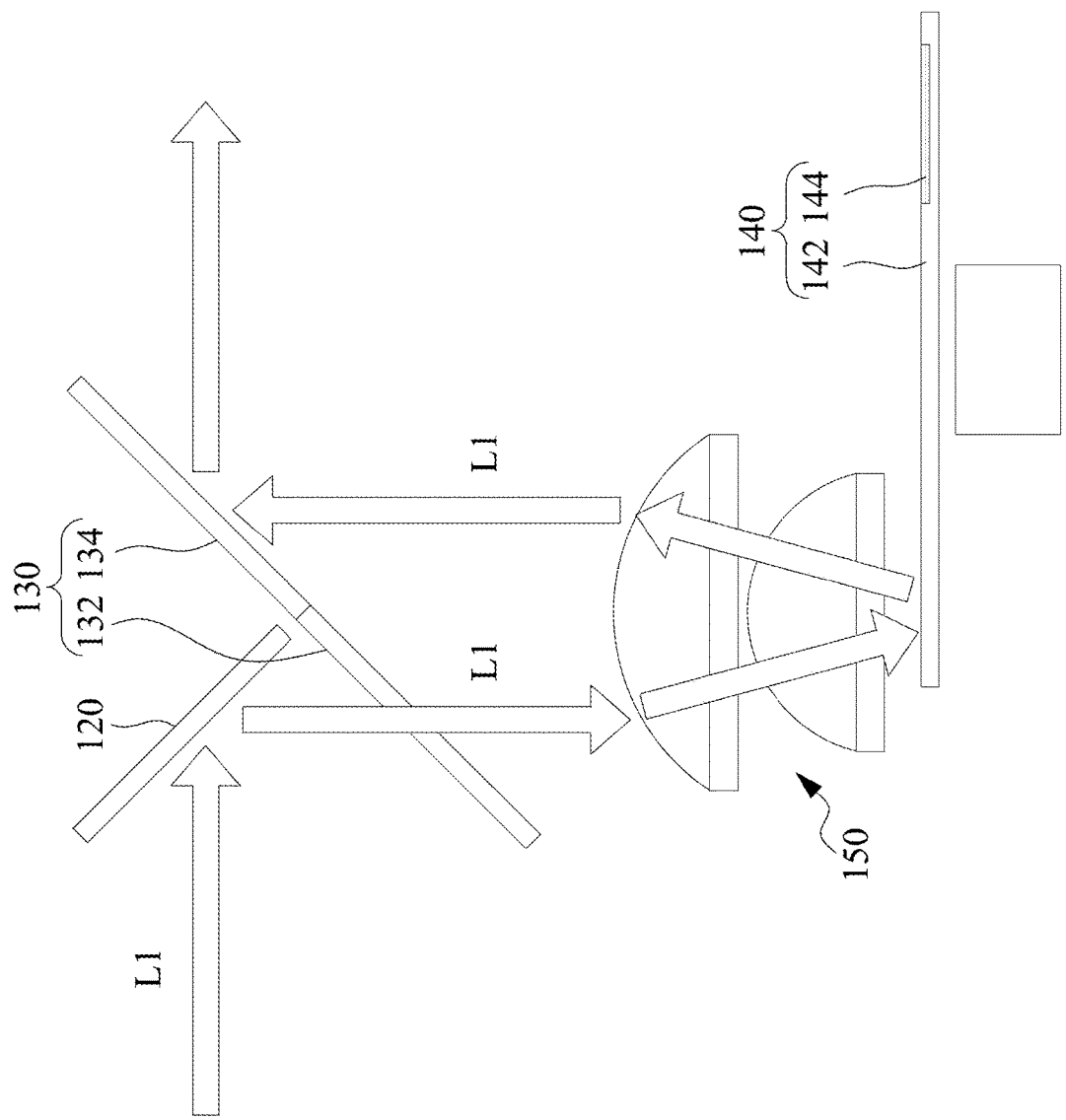
FIG. 2 is a partially enlarged view of the light path of the illumination system for the projector of FIG. 1 when being in operation.
Figure 3:
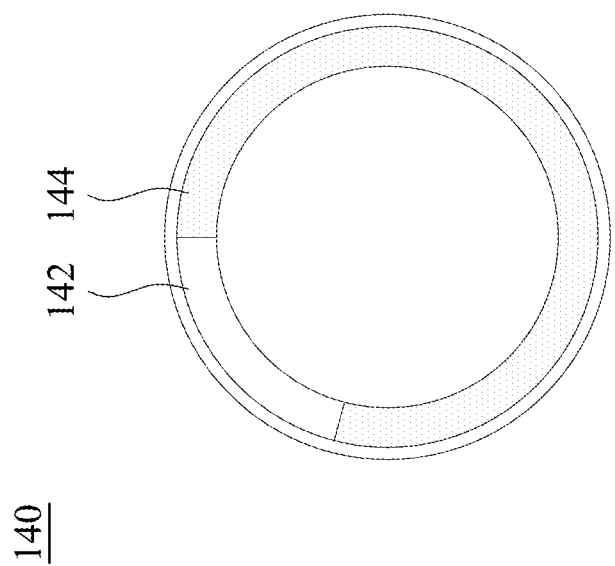
FIG. 3 is a top view of a phosphor wheel of FIG. 2.

FIG. 2 is a partially enlarged view of the light path of the illumination system 100 for the projector of FIG. 1 when being in operation. FIG. 3 is a top view of the phosphor wheel 140 of FIG. 2. As shown in FIG. 2 and FIG. 3, the phosphor wheel 140 has a reflective region 142 and a first wavelength conversion region 144. The reflective region 142 of the phosphor wheel 140 is can reflect a first portion of the blue light L1. In some embodiments, the reflective region 142 of the phosphor wheel 140 is a mirror surface. The material of the reflective region 142 may includes silver, white glue, or titanium dioxide (TiO$_2$), and the first wavelength conversion region 144 may include yellow phosphors, but the present disclosure is not limited to this regard.

As shown in FIG. 1 and FIG. 2, the lens assembly 150 is located between the first beam splitter 130 and the phosphor wheel 140, and may include plural convex lens. The lens assembly 150 can concentrate light to refract the blue light L that transmits in the second direction D2 to the phosphor wheel 140.

Specifically, the lens assembly 150 can refract the first portion of the blue light L1 to the reflective region 142 of the phosphor wheel 140, and can refract the first portion of the blue light L1 that is reflected from the reflective region 142 to the lens assembly 150 to the reflective region 134 of the first beam splitter 130 in a third direction D3, in which the third direction D3 is opposite to the second direction D2. In addition, the reflective region 134 of the first beam splitter 130 may reflect the first portion of the blue light L1 that transmits along the third direction D3 to transmit along the first direction D1, thereby forming a T-type light path.

Figure 4:
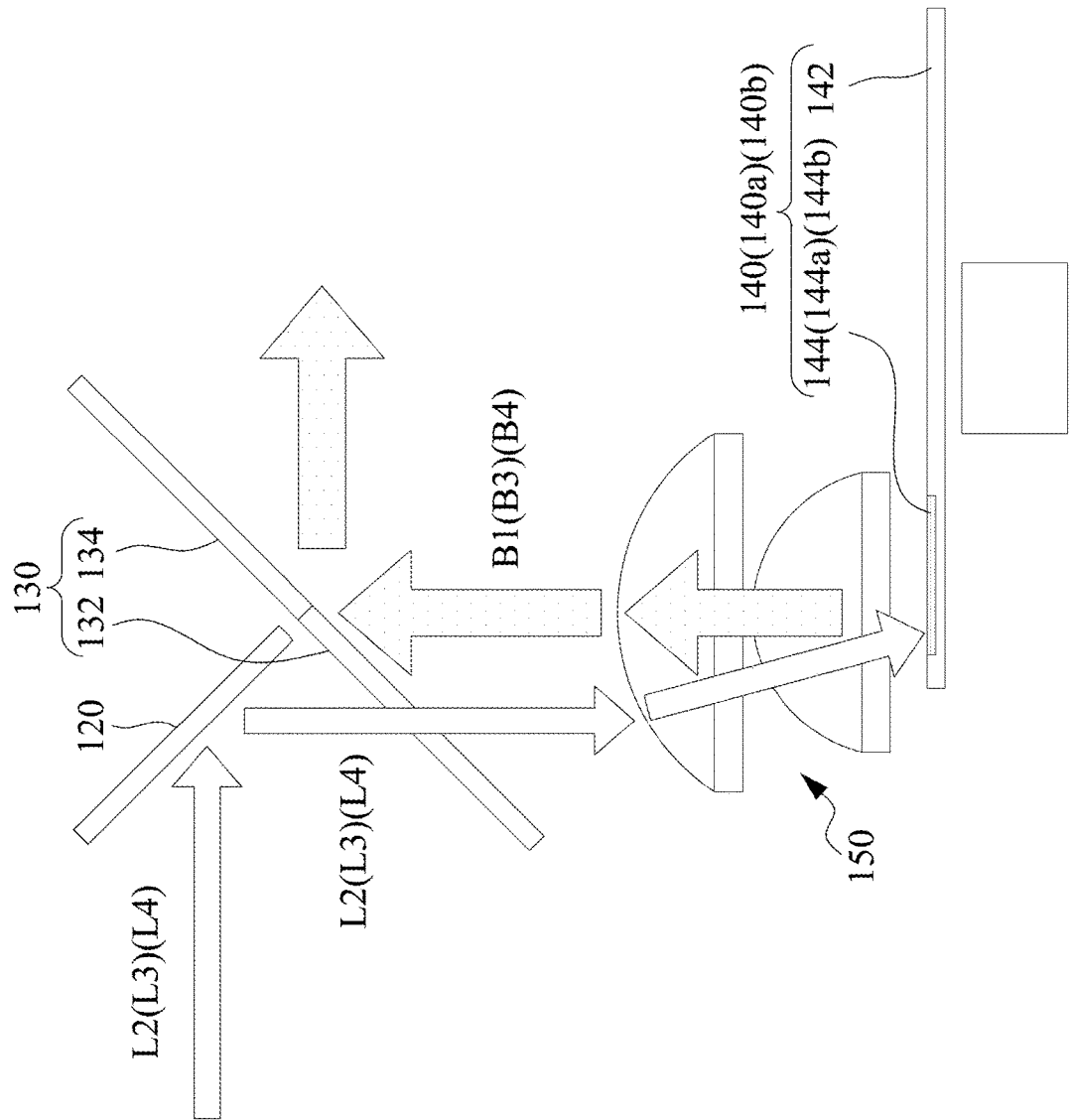
FIG. 4 is a partially enlarged view of the light path of the illumination system for the projector of FIG. 1 when being in operation.

FIG. 4 is a partially enlarged view of the light path of the illumination system 100 for the projector of FIG. 1 when being in operation. As shown in FIG. 1 and FIG. 4, the lens assembly 150 can refract the blue light L that transmits in the second direction D2 to the phosphor wheel 140.

Specifically, the lens assembly 150 can refract a second portion of the blue light L2 to the first wavelength conversion region 144 (also shown in FIG. 3) of the phosphor wheel 140, and the first wavelength conversion region 144 can activate the second portion of the blue light L2 to form first band light B1. The lens assembly 150 may allow the first band light B1 to pass through. The first band light B1 is scattered light and transmits in the third direction D3. The whole region (including the reflective region 134) of the first beam splitter 130 may reflect the first band light B1, such that the first band light B1 is reflected to transmit in the first direction D1 to form the T-type light path.

In some embodiments, the illumination system 100 for the projector further includes a light concentrating module 170 that is located between the first beam splitter 130 and the light engine module 105. The light concentrating module 170 may concentrate the first band light B1 and the first portion of the blue light L1 to the light engine module 105, in which the first band light B1 and the first portion of the blue light L1 are reflected by the first beam splitter 130 to transmit in the first direction D1. Furthermore, the light concentrating module 170 can mix light, which is helpful for light uniformity. Moreover, the optical axis of the light concentrating module 170 is parallel to the optical axis of the beam reducing module 160, which facilitates forming the T-type light path.

Referring to FIG. 1, in summary, the light source module 110 emits the blue light L along the first direction D1 and the blue light L may be reflected by the reflective mirror 120 to pass through the blue light transmissive region 132 of the first beam splitter 130, and thus the first portion of the blue light L1 may be reflected by the reflective region 142 (see FIG. 3) of the phosphor wheel 140.

Furthermore, since the second portion of the blue light L2 may be activated by the first wavelength conversion region 144 (see FIG. 3) of the phosphor wheel 140 to form the first band light B1, and the reflective region 134 of the first beam splitter 130 can reflect the first portion of the blue light L1 and the first band light B1 to the light engine module 105 along the first direction D1, the light-emitting direction of the light source module 110 is the same as the light-receiving direction of the light engine module 105 (i.e., the first direction D1), which results in T-type light path.

Such a configuration may be suitable for a slim projection system. Moreover, since the light-emitting direction of the light source module 110 and the light-receiving direction of the light engine module 105 are the same, angle deviations in the light path of a product during manufacturing processes can be prevented, thereby improving light efficiency.

FIGS. 5 to 7 are top views of phosphor wheels 140a-140b-140c according to various embodiments of the present disclosure. The phosphor wheels 140a-140b-140c may replace the aforementioned phosphor wheel 140. As shown in FIG. 4 and FIG. 5, the difference between this embodiment and the embodiment of FIG. 3 is that the phosphor wheel 140a further includes a second wavelength conversion region 146. The second wavelength conversion region 146 is configured to activate a third portion of the blue light L3 to form a second band light B2. Furthermore, the second wavelength conversion region 146 of the phosphor wheel 140*a* may include green phosphors.

As shown in FIG. 4 and FIG. 6, the difference between this embodiment and the embodiment of FIG. 5 is that the phosphor wheel 140*b* further includes a third wavelength conversion region 148. The third wavelength conversion region 148 is configured to activate a fourth portion of the blue light L4 to form a third band light B3. Moreover, the third wavelength conversion region 148 of the phosphor wheel 140*b* may include red phosphors.

As shown in FIG. 4 and FIG. 7, the difference between this embodiment and the embodiment of FIG. 5 is that the phosphor wheel 140*c* includes the third wavelength conversion region 148 but includes no first wavelength conversion region 144. The third wavelength conversion region 148 and the second wavelength conversion region 146 may respectively include the red phosphors and the green phosphors. It is to be noted that the phosphor wheel 140*c* in this embodiment has two wavelength conversion regions. Therefore, the third wavelength conversion region 148 may be referred to as a first wavelength conversion region that uses the red phosphors to replace the yellow phosphors.

Figure 8:
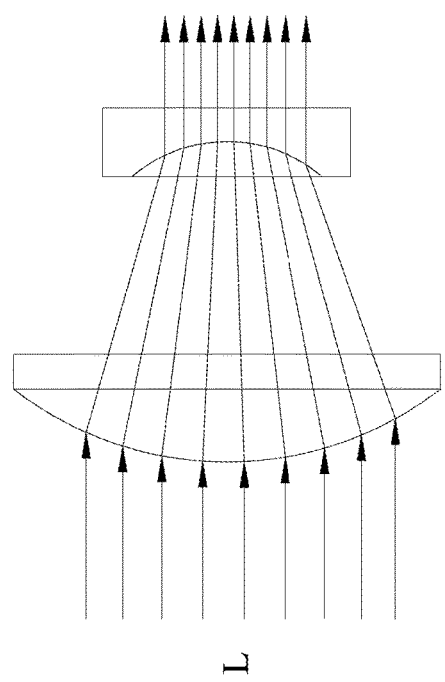
FIG. 8 is a schematic view of a beam reducing module according to one embodiment of the present disclosure, in which a light beam passes through the beam reducing module.

FIG. 8 is a schematic view of the beam reducing module 160 according to one embodiment of the present disclosure, in which a light beam passes through the beam reducing module 160. As shown in FIG. 1 and FIG. 8, the beam reducing module 160 is located between the light source module 110 and the reflective mirror 120, may include a convex lens and a concave lens. The beam reducing module 160 is configured to concentrate a laser beam (i.e., the blue light L) to reduce light energy loss between the reflective mirror 120 and the blue light transmissive region 132 of the first beam splitter 130.

Figure 9:
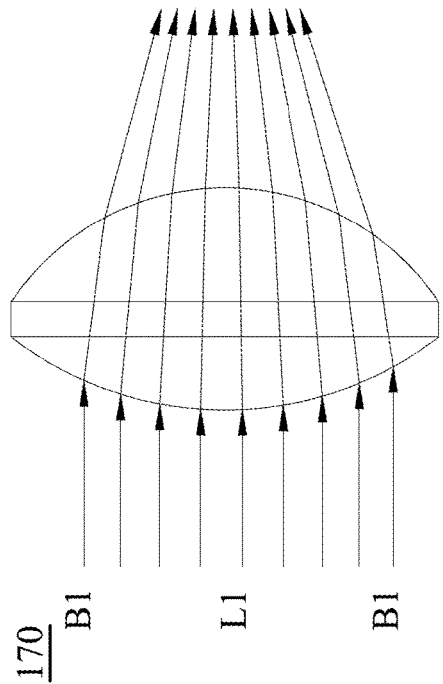
FIG. 9 is a schematic view of a light concentrating module according to one embodiment of the present disclosure, in which a light beam passes through the light concentrating module.

FIG. 9 is a schematic view of the light concentrating module 170 according to one embodiment of the present disclosure, in which a light beam passes through the light concentrating module 170. As shown in FIG. 1 and FIG. 9, the light concentrating module 170 is located between the first beam splitter 130 and the light engine module 105, and may be a single lens, such as a biconvex lens. The light concentrating module 170 may concentrate the first band light B1 and the first portion of the blue light L1 to the light engine module 105, in which the first band light B1 and the first portion of the blue light L1 are reflected by the first beam splitter 130 to transmit in the first direction D1. Since the first band light B1 is scattered light, the first band light B1 is at outer side and the first portion of the blue light L1 is at inner side before the beam enters the light concentrating module 170. In addition, after the beam passes through the light concentrating module 170, the first band light B1 and the first portion of the blue light L1 will be mixed due to a transmitting distance.

Figure 10:
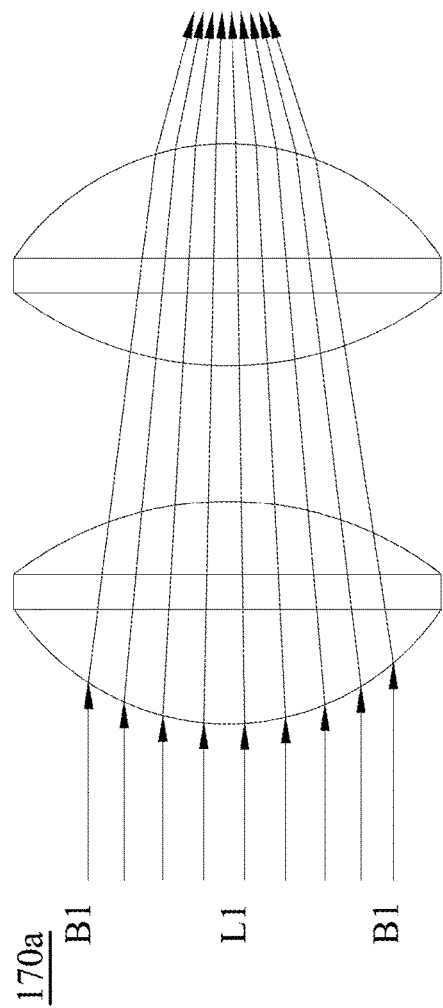
FIG. 10 is a schematic view of a light concentrating module according to another embodiment of the present disclosure, in which a light beam passes through the light concentrating module.

FIG. 10 is a schematic view of a light concentrating module 170*a* according to another embodiment of the present disclosure, in which a light beam passes through the light concentrating module 170*a*. The difference between this embodiment and the embodiment of FIG. 9 is that the light concentrating module 170*a* includes plural lenses, such as two biconvex lenses.

It is to be noted that the connection relationships, the materials, and the advantages of the elements described above will not be repeated in the following description. In the following description, other types of illumination systems for projectors will be explained.

Figure 11:
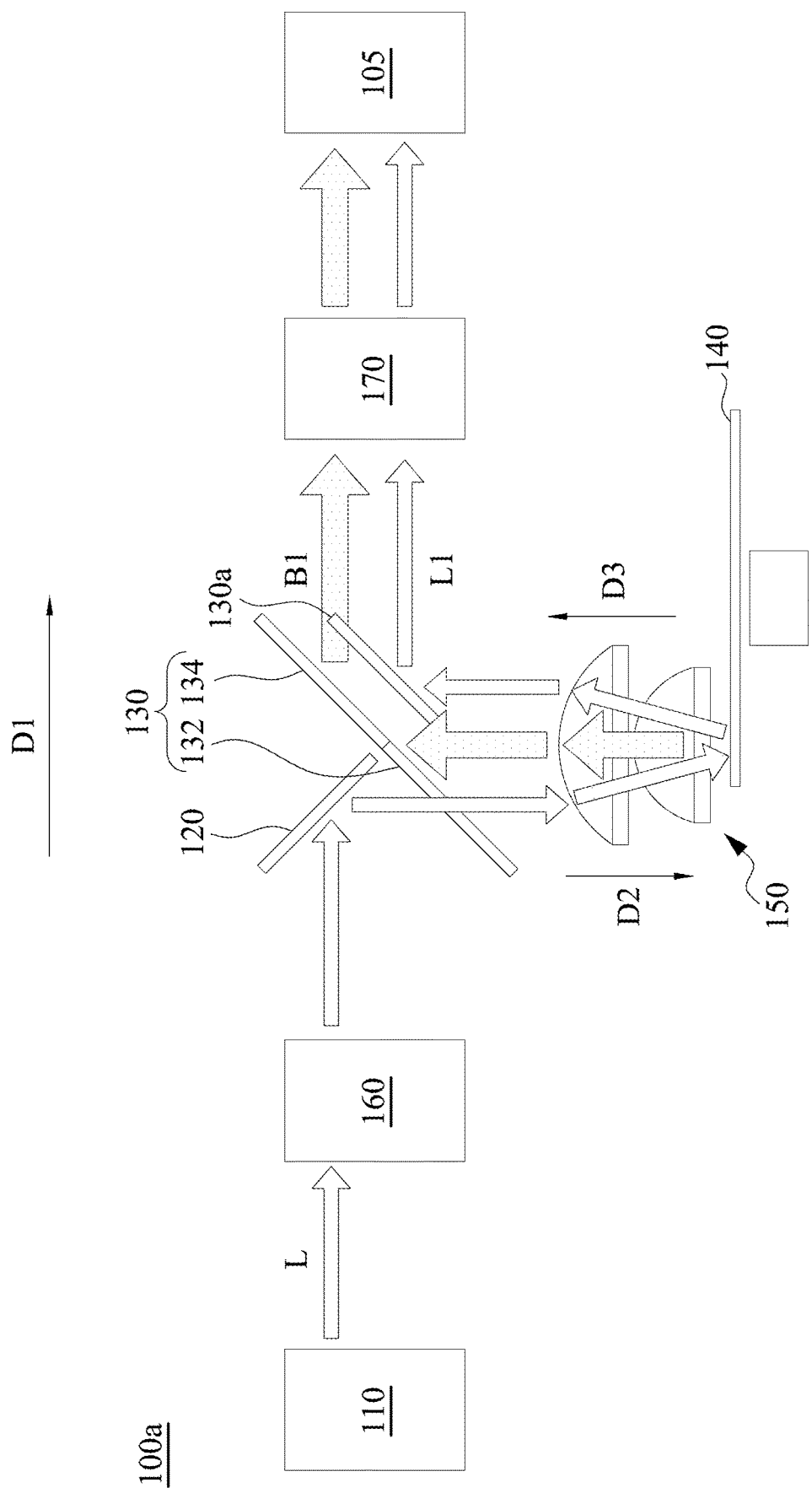
FIG. 11 is a schematic view of a light path of an illumination system for a projector when being in operation according to another embodiment of the present disclosure.

FIG. 11 is a schematic view of a light path of an illumination system 100*a* for a projector when being in operation according to another embodiment of the present disclosure. The illumination system 100*a* for the projector includes the light engine module 105, the light source module 110, the reflective mirror 120, the first beam splitter 130, the phosphor wheel 140, and the lens assembly 150. The difference between this embodiment and the embodiment of FIG. 1 is that the illumination system 100*a* for the projector further includes a second beam splitter 130*a*.

The second beam splitter 130*a* is located between the first beam splitter 130 and the lens assembly 150. The second beam splitter 130*a* is configured to reflect the first portion of the blue light L1 and allow the first band light B1 to pass through. After the first band light B1 passes through the second beam splitter 130*a*, the first band light B1 can be reflected by the first beam splitter 130.

As a result, the reflected first portion of the blue light L1 and the reflected first band light B1 may tend to coincide more through the configuration of the second beam splitter 130*a*, and the second beam splitter 130*a* ensures the reflected first portion of the blue light L1 and the reflected first band light B1 being parallel to each other and transmitting in the first direction D1.

Figure 12:
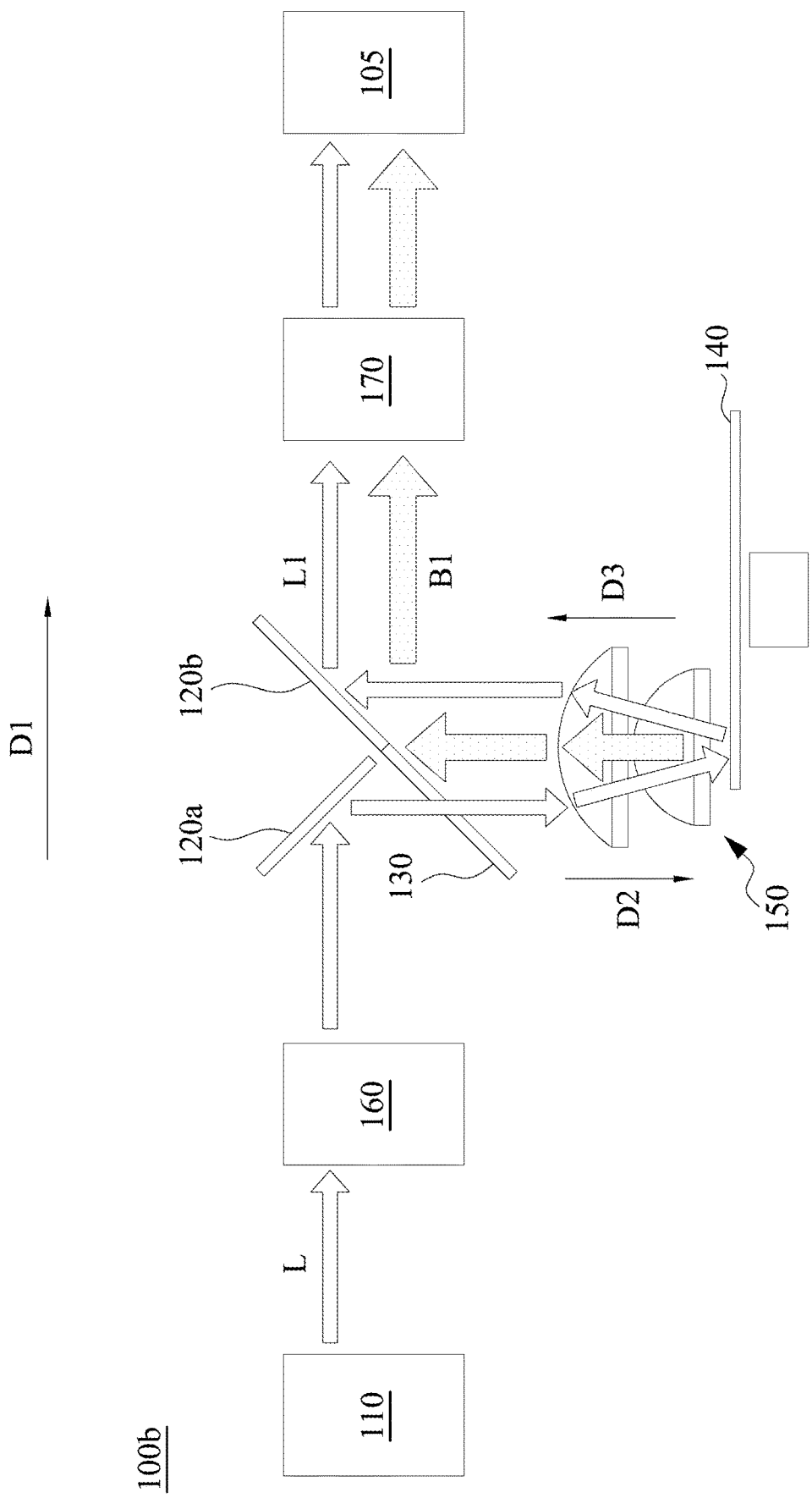
FIG. 12 is a schematic view of a light path of an illumination system for a projector when being in operation according to still another embodiment of the present disclosure.

FIG. 12 is a schematic view of a light path of an illumination system 100*b* for a projector when being in operation according to still another embodiment of the present disclosure. The illumination system 100*b* for a projector includes the light engine module 105, the light source module 110, a first reflective mirror 120*a*, the first beam splitter 130, the phosphor wheel 140, a second reflective mirror 120*b*, and the lens assembly 150. The first direction D1 is defined from the light source module 110 to the light engine module 105. The light source module 110 may emit the blue light L along the first direction D1. The first reflective mirror 120*a* can reflect the blue light L such that the blue light L transmits in the second direction D2. The first beam splitter 130 may allow the blue light L that transmits in the second direction D2 to pass through. The structure and operation method of the phosphor wheel 140 are similar to the description associated with FIGS. 1 to 7, and will not be repeated again.

The second reflective mirror 120*b* is connected to one end of the first beam splitter 130. In this embodiment, the second reflective mirror 120*b* extends from said end of the first beam splitter 130 along the lengthwise direction of the first beam splitter 130, and the first reflective mirror 120*a* is perpendicular to the second reflective mirror 120*b*. The lens assembly 150 is located between the first beam splitter 130 and the phosphor wheel 140. The lens assembly 150 can refract the blue light L that transmits in the second direction D2 to the phosphor wheel 140, and can refract the first portion of the blue light L1 that is reflected by the reflective region 142 (see FIG. 3) of the phosphor wheel 140 to the second reflective mirror 120*b* in the third direction D3.

Moreover, the lens assembly 150 may allow the first band light B1 that is activated by the first wavelength conversion region 144 (see FIG. 3) of the phosphor wheel 140 to pass through. The second reflective mirror 120*b* may reflect the first portion of the blue light L1 and the first band light B1 to the light engine module 105 along the first direction D1. In this embodiment, the whole region of the first beam splitter 130 may reflect the first band light B1.

In some embodiments, the phosphor wheel 140 of the illumination system 100*b* for the projector may be one of the aforementioned phosphor wheels 140, 140*a*, 140*b*, and 140*c*. The illumination system 100*b* for the projector may further include the aforementioned beam reducing module 160 and one of the aforementioned light concentrating modules 170 and 170*a*.

Since the light source module 110 emits the blue light L along the first direction D1 and the blue light L may be reflected by the first reflective mirror 120a to pass through the first beam splitter 130, the first portion of the blue light L1 may be reflected by the reflective region 142 (see FIG. 3) of the phosphor wheel 140. Furthermore, because the second portion of the blue light L2 (see FIG. 4) may be activated by the first wavelength conversion region 144 of the phosphor wheel 140 to form the first band light B1, and the second reflective mirror 120b can reflect the first portion of the blue light L1 and the first band light B1 to the light engine module 105 along the first direction D1, the light-emitting direction of the light source module 110 is the same as the light-receiving direction of the light engine module 105 (i.e., the first direction), which results in T-type light path.

Such a configuration may be suitable for a slim projection system. Moreover, since the light-emitting direction of the light source module 110 and the light-receiving direction of the light engine module 105 are the same, angle deviations in the light path of a product during manufacturing processes can be prevented, thereby improving light efficiency.

Figure 13:
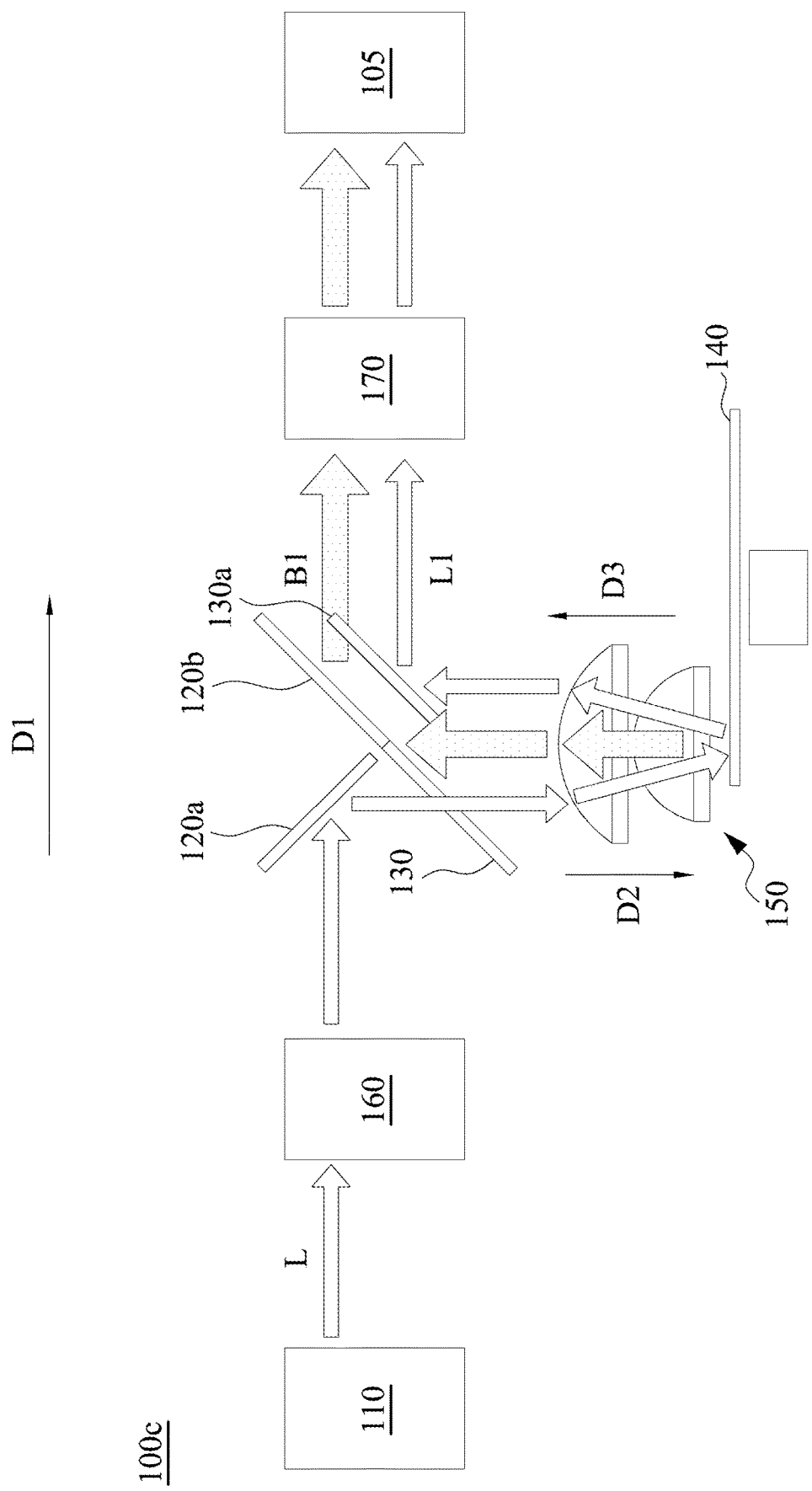
FIG. 13 is a schematic view of a light path of an illumination system for a projector when being in operation according to yet another embodiment of the present disclosure.

FIG. 13 is a schematic view of a light path of an illumination system 100c for a projector when being in operation according to yet another embodiment of the present disclosure. The difference between this embodiment and the embodiment of FIG. 12 is that the illumination system 100c for the projector further includes the second beam splitter 130a. The second beam splitter 130a is located between the second reflective mirror 120b and the lens assembly 150.

The second beam splitter 130a is configured to reflect the first portion of the blue light L1 and allow first band light B1 to pass through. After the first band light B1 passes through the second beam splitter 130a, the first band light B1 can be reflected by the second reflective mirror 120b, and can be reflected by the first beam splitter 130, too. As a result, the reflected first portion of the blue light L1 and the reflected first band light B1 may tend to coincide more through the configuration of the second beam splitter 130a, and the second beam splitter 130a ensures the reflected first portion of the blue light L1 and the reflected first band light B1 being parallel to each other and transmitting in the first direction D1.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An illumination system for a projector, comprising:
   a light engine module;
   a light source module, wherein a first direction is defined from the light source module to the light engine module, and the light source module is configured to emit blue light along the first direction;
   a reflective mirror configured to reflect the blue light such that the blue light transmits in a second direction;
   a first beam splitter having a blue light transmissive region and a reflective region, wherein the blue light transmissive region of the first beam splitter is configured to allow the blue light that transmits in the second direction to pass through;
   a phosphor wheel having a reflective region and a first wavelength conversion region, wherein the reflective region of the phosphor wheel is configured to reflect a first portion of the blue light, and the first wavelength conversion region is configured to activate a second portion of the blue light to form first band light; and
   a lens assembly located between the first beam splitter and the phosphor wheel, configured to refract the blue light that transmits in the second direction to the phosphor wheel, configured to refract the first portion of the blue light to the reflective region of the first beam splitter in a third direction opposite to the second direction, and configured to allow the first band light to pass through, wherein the reflective region of the first beam splitter is configured to reflect the first portion of the blue light and the first band light to the light engine module along the first direction.

2. The illumination system for the projector of claim 1, wherein the reflective mirror is located between the light source module and the first beam splitter.

3. The illumination system for the projector of claim 1, wherein the reflective mirror is perpendicular to the first beam splitter.

4. The illumination system for the projector of claim 1, wherein the first beam splitter is located between the reflective mirror and the light engine module.

5. The illumination system for the projector of claim 1, further comprising:
   a beam reducing module located between the light source module and the reflective mirror.

6. The illumination system for the projector of claim 1, further comprising:
   a light concentrating module located between the first beam splitter and the light engine module.

7. The illumination system for the projector of claim 1, wherein the reflective region of the phosphor wheel is a mirror surface.

8. The illumination system for the projector of claim 1, wherein a material of the reflective region of the phosphor wheel comprises silver, white glue, or titanium dioxide ($TiO_2$).

9. The illumination system for the projector of claim 1, wherein the first wavelength conversion region of the phosphor wheel comprises yellow phosphors.

10. The illumination system for the projector of claim 1, wherein the phosphor wheel further comprises a second wavelength conversion region configured to activate a third portion of the blue light to form a second band light.

11. The illumination system for the projector of claim 10, wherein the second wavelength conversion region of the phosphor wheel comprises green phosphors.

12. The illumination system for the projector of claim 1, wherein the phosphor wheel further comprises a third wavelength conversion region configured to activate a fourth portion of the blue light to form a third band light.

13. The illumination system for the projector of claim 12, wherein the third wavelength conversion region of the phosphor wheel comprises red phosphors.

14. The illumination system for the projector of claim 1, wherein the phosphor wheel further comprises a second wavelength conversion region, and the first wavelength conversion region and the second wavelength conversion region respectively include red phosphors and green phosphors.

15. The illumination system for the projector of claim 1, further comprising:
a second beam splitter located between the first beam splitter and the lens assembly, and configured to reflect the first portion of the blue light and allow the first band light to pass through.

16. An illumination system for a projector, comprising:
a light engine module;
a light source module, wherein a first direction is defined from the light source module to the light engine module, and the light source module is configured to emit blue light along the first direction;
a first reflective mirror configured to reflect the blue light such that the blue light transmits in a second direction;
a first beam splitter configured to allow the blue light that transmits in the second direction to pass through;
a phosphor wheel having a reflective region and a first wavelength conversion region, wherein the reflective region of the phosphor wheel is configured to reflect a first portion of the blue light, and the first wavelength conversion region is configured to activate a second portion of the blue light to form first band light; and
a second reflective mirror connected to one end of the first beam splitter; and
a lens assembly located between the first beam splitter and the phosphor wheel, configured to refract the blue light that transmits in the second direction to the phosphor wheel, configured to refract the first portion of the blue light to the second reflective mirror in a third direction opposite to the second direction, and configured to allow the first band light to pass through, wherein the second reflective mirror is configured to reflect the first portion of the blue light and the first band light to the light engine module along the first direction.

17. The illumination system for the projector of claim 16, wherein the second reflective mirror extends from said end of the first beam splitter along a lengthwise direction of the first beam splitter.

18. The illumination system for the projector of claim 16, wherein the first reflective mirror is perpendicular to the second reflective mirror.

19. The illumination system for the projector of claim 16, further comprising:
a second beam splitter located between the second reflective mirror and the lens assembly, and configured to reflect the first portion of the blue light and allow first band light to pass through.

20. The illumination system for the projector of claim 16, wherein the reflective region of the phosphor wheel is a mirror surface, and the first wavelength conversion region of the phosphor wheel comprises yellow phosphors.

* * * * *